Jan. 13, 1970   M. FOËX   3,490,067

CERAMIC PART FOR ELECTRODES

Filed May 18, 1966

_United States Patent Office_

3,490,067
Patented Jan. 13, 1970

3,490,067
CERAMIC PART FOR ELECTRODES
Marc Foëx, Montlouis, France, assignor to Commissariat
à l'Energie Atomique, Paris, France
Filed May 18, 1966, Ser. No. 551,144
Claims priority, application France, May 25, 1965,
18,236
Int. Cl. H01b 1/08, 5/00; C04b 35/00
U.S. Cl. 252—521          1 Claim

ABSTRACT OF THE DISCLOSURE

Disclosed is a ceramic part for electrodes of magnetohydrodynamic converters having a composition consisting essentially of rare earth chromites and 5 to 25% of a substantially stoichiometric mixture of chromic oxide and rare earth oxide.

---

Figure 1:
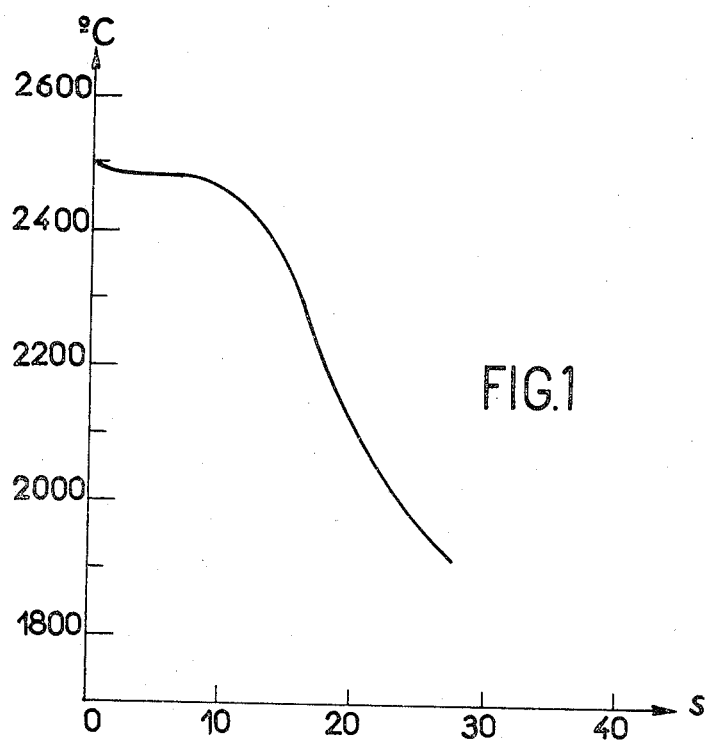

The present invention is concerned with ceramic parts which are suitable for the fabrication of high-temperature electrodes and especially electrodes which are designed for use in magnetohydrodynamic (MHD) converters. The invention is also directed to the fabrication of said ceramic parts.

The ceramic parts which are employed for the fabrication of electrodes for MHD generators are usually formed of refractory oxides such as zirconia and thoria which are stabilized by a predetermined percentage of calcium oxide, yttrium oxide or rare-earth oxide, the additional function of these latter being to render the oxides of zirconium and thorium more highly conductive at high temperature.

However, only the part which is sufficiently heated in these oxides is conductive; this is the case, for example, of MHD generators in which the electrode which usually has the shape of a plate is heated on one face, namely that face which is in contact with the ionized gases. Above a certain thickness, the stabilized refractory oxide is no longer sufficiently hot to be conductive.

The present invention relates to a ceramic part which is not subject to these disadvantages. Said part is in fact electrically conductive from room temperature up to its melting temperature.

The ceramic part for electrodes as contemplated by this invention is characterized in that it is constituted by chromites of rare earths corresponding to the general formula $RCrO_3$ wherein R designates an element which belongs to the rare earth group. In the case of lanthanum chromite which is taken as an example, the conductivity which is 53 Mho-m. at 2100° K. is still 40 Mho-m. at 1500° K.

The method of preparation of a component of this type comprises the steps of crushing fused or sintered blocks of rare-earth chromites to a particle size of less than 100 microns, of shaping under a pressure of at least 2 t./cm.$^2$ and of sintering at a temperature above 2000° C.

The said blocks of rare-earth chromites are prepared in the following manner. A mixture of chromic oxide and rare-earth oxide in stoichiometric ratio is employed as starting material and fused at a temperature which is higher than 2500° C. However, in the particular case of preparation of lanthanum chromite, the proportion of chromic oxide $Cr_2O_3$ will be slightly higher than the stoichiometric ratio with a view to obtaining a final product which does not contain any oxide of free lanthanum. It accordingly follows that, for one molecule of $La_2O_3$ there should preferably be 1.02 to 1.05 molecule of $Cr_2O_3$. The fusion can be carried out in a solar furnace, in a plasma furnace, in an arc furnace, or else by high-frequency induction heating.

The blocks obtained after cooling are crushed to a suitable particle size. Then, after addition of an organic binder, the mixture is shaped by any suitable methods (bubbling vessel, extrusion, manual casting) under a pressure of at least 2 t./cm.$^2$, the complete part thus obtained being then sintered at a temperature above 2200° C.

In accordance with one alternative mode of execution of the method in accordance with the invention, there is added to the crushed rare-earth chromites a proportion of a substantially stoichiometric mixture of chromic oxide and rare-earth oxide as obtained by co-precipitation, by addition of ammonia, of a mixture in substantially stoichiometric ratio of aqueous solutions of soluble salts, on the one hand of rare earths and on the other hand of chromium. Said soluble salts are constituted as a rule by chlorides and/or nitrates. The rare earths and the chromium precipitate from their aqueous saline solutions by addition of ammonia, in the form of hydroxides which decompose above 300° C. to yield oxides and water. The co-precipitate of chromic oxide and rare-earth oxides which is incorporated with the crushed rare-earth chromites serves as a binder and facilitates the sintering operation. The proportion by weight of co-precipitate to be added to the powdered rare-earth chromite preferably comprises between 5 and 25% and makes it possible to lower the sintering temperature to a temperature of the order of 1500° C.

The co-precipitate can be incorporated with the crushed rare-earth chromites either in the form of oxide or alternatively in the form of chromite. In this latter case, said co-precipitate is subjected to calcination at a temperature comprised between 600 and 1200° C. Over this temperature range, the co-precipitated products react to produce chromites.

It is again possible to facilitate the sintering of the powders of fused rare-earth chromites by carrying out a very partial surface attack of these chromites by nitric acid.

The ceramic parts for electrodes as contemplated by the invention are characterized by excellent electrical conductivity from room temperature up to their melting temperature, and are therefore particularly suitable for the fabrication of electrodes which are primarily intended to establish an electrical connection between a fluid at high temperature and a conductor at low temperature as is the case with magnetohydrodynamic converters.

Said ceramic parts additionally possess low thermal conductivity which is substantially lower than that of metals and metal alloys. This property is an advantage for the purpose of maintaining at a high temperature the frontal electrode face which is in contact with the hot gases.

In order that a ceramic part may usefully be employed in the fabrication of electrodes which operate at high temperatures, it must satisfy two essential conditions:

it must have sufficient high-temperature strength properties,
it must not give rise to allotropic transformations which are liable to cause fracture of formed ceramic parts as a result of abrupt changes in volume.

The above conditions are satisfied by the ceramic parts which are formed of rare-earth chromite, as can be verified by thermal analysis.

Furthermore, a third condition must necessarily be fulfilled in order to prevent the destruction of MHD electrodes under normal conditions of operation of an electrode of this type (direct-current generation), viz: the conductivity must be of electronic nature. This condition is met by the rare-earth chromites.

The points of solidification of the ceramic parts in accordance with the invention have been determined by thermal analysis during the cooling process which follows fusion.

The tests were carried out by a method described by M. Foex in the "Bulletin de la Societe Chimique de France," p. 137 (1962). Small centrifugal furnaces of 10 cm.³ were employed for processing approximately 50 grams of rare-earth chromites which were placed on the hearth of a solar furnace. The fused material (of the order of 20 grams) in the central portion of the furnace forms a cavity under the action of centrifugal force. Thermal analysis is then carried out during cooling after occultation of the solar rays.

The cooling curves have the shape shown in FIG. 1 in reference to lanthanum chromite; the times in seconds are plotted as abscissae and the temperatures in degrees centigrade are plotted as ordinates. The solidification stage is well marked, which indicates a particularly substantial heat of solidification or heat of fusion.

Figure 2:
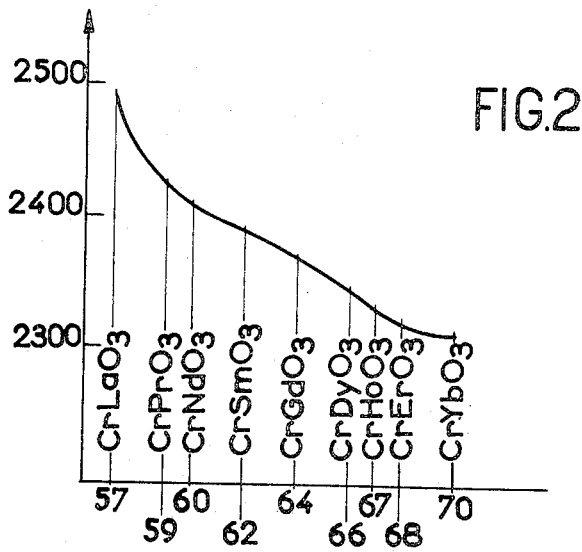

FIG. 2 gives the values of the solidification points of the different rare-earth chromites as placed in the order of atomic number of the rare-earth elements R, the temperatures of solidification in degrees centigrade being plotted as ordinates. It will be noted that lanthanum chromite has very high temperature resistance since it solidifies at approximately 2500° C., that is to say at a temperature which is substantially higher than that of the melting points of the constituent oxides $Cr_2O_3$ and $La_2O_3$ (solidification points of approximately 2300° C. in each case). The solidification points of the other chromites decrease progressively as one proceeds further in the series to attain approximately 2315° C. in the case of ytterbium chromite.

The ceramic parts in accordance with the invention meet with a particularly valuable application in the fabrication of electrodes of the type described in the copending patent application entitled "Composite Electrode for Magnetohydrodynamic Generator" as filed this day jointly in the name of Commissariat a l'Energie Atomique and Institut Francais des Petroles, and having U.S. Ser. No. 551,151, filed May 18, 1966, now U.S. Patent No. 3,430,082.

Two examples of execution of the method of preparation of ceramic parts in accordance with the invention will now be described without any limitation being implied.

EXAMPLE 1

The starting material employed was a mixture containing 1 part of lanthanum oxide and 1.02 part of chromic oxide. The mixture was fused in a solar furnace at a temperature of 2550° C. and the blocks of lanthanum chromite which were obtained after cooling were crushed to a particle size of less than 100μ. After addition of 1% of an organic binder, the mixture was shaped by isostatic pressing under a pressure of 2 t./cm.². The parts were then sintered at a temperature of 1750° C.

EXAMPLE 2

The mixture employed as starting material was identical with that of Example 1. The fusion of the mixture and crushing of the blocks were carried out as hereinabove described.

The lanthanum chromite powder then received an addition of 15% of a co-precipitate of lanthanum chromite. The aggregate was then shaped by isostatic pressing under a pressure of 2 t./cm.². The parts were then sintered at a temperature of 1600° C.

What we claim is:

1. Ceramic part for electrodes of magnetohydrodynamic converters consisting essentially of chromites of rare earths corresponding to the general formula $RCrO_3$ wherein R designates an element of the rare earth group the remainder being from 5 to 25% of a substantially stoichiometric mixture of chromic oxide and rare-earth oxide.

References Cited

UNITED STATES PATENTS

| | | | |
|---|---|---|---|
| 2,378,209 | 6/1945 | Fuller et al. | 252—462 XR |
| 2,622,304 | 12/1952 | Coffer | 252—518 |
| 3,149,253 | 9/1964 | Luebke | 310—11 |

J. D. WELSH, Primary Examiner

U.S. Cl. X.R.

23—145; 106—39, 66; 252—518; 310—10